United States Patent
Das (10) Patent No.: US 11,307,832 B2
(45) Date of Patent: Apr. 19, 2022

(54) SYSTEM AND METHOD FOR INTERFACING INCIDENT AND CONTINUOUS INTEGRATION SYSTEMS

(71) Applicant: ServiceNow, Inc., Santa Clara, CA (US)

(72) Inventor: Santosh Kumar Das, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 16 days.

(21) Appl. No.: 16/233,540

(22) Filed: Dec. 27, 2018

(65) Prior Publication Data
US 2020/0210151 A1    Jul. 2, 2020

(51) Int. Cl.
| | |
|---|---|
| *G06F 11/00* | (2006.01) |
| *G06F 8/34* | (2018.01) |
| *G06F 8/20* | (2018.01) |
| *G06F 21/31* | (2013.01) |

(52) U.S. Cl.
CPC .................. *G06F 8/34* (2013.01); *G06F 8/20* (2013.01); *G06F 21/31* (2013.01)

(58) Field of Classification Search
CPC ..... G06F 8/34; G06F 8/20; G06F 8/30; G06F 8/60; G06F 8/70; G06F 11/04; G06F 11/07; G06F 11/36
See application file for complete search history.

(56) References Cited

U.S. PATENT DOCUMENTS

| | | |
|---|---|---|
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |

(Continued)

*Primary Examiner* — Lewis A Bullock, Jr.
*Assistant Examiner* — Mohammad H Kabir
(74) *Attorney, Agent, or Firm* — Fletcher Yoder P.C.

(57) ABSTRACT

A computing system includes a server. The server is communicatively coupled to a data repository and is configured to perform operations comprising creating, via a visual information flow creation tool, at least one information flow object. The server is additionally configured to perform operations comprising creating an incident management interface for the at least one information flow object, and executing the incident management interface to communicate with an incident management system.

13 Claims, 8 Drawing Sheets

(56) References Cited

U.S. PATENT DOCUMENTS

| | | | |
|---|---|---|---|
| 9,065,783 B2 | 6/2015 | Ding | |
| 9,122,552 B2 | 9/2015 | Whitney | |
| 9,239,857 B2 * | 1/2016 | Trinon | G06F 16/248 |
| 9,535,737 B2 | 1/2017 | Joy | |
| 9,697,352 B1 * | 7/2017 | Armstrong | G06F 21/50 |
| 9,715,675 B2 * | 7/2017 | Chakravarty | G06Q 10/10 |
| 9,792,387 B2 | 10/2017 | George | |
| 2007/0174693 A1 * | 7/2007 | Gerber | G06F 11/0793 |
| | | | 714/15 |
| 2019/0303139 A1 * | 10/2019 | Pechacek | G06F 3/04817 |

* cited by examiner

SYSTEM AND METHOD FOR INTERFACING INCIDENT AND CONTINUOUS INTEGRATION SYSTEMS

BACKGROUND

The present disclosure relates generally to a system and method for creating and executing interfaces to incident systems and continuous integration systems.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Within the context of cloud computing solutions for data repositories, users may be asked to deal with ever increasing amounts of data, e.g., including certain date-based information stored in the data repositories. In fact, the amount of cloud-based and date-based data collected and stored in today's cloud computing solutions, such as cloud-based repositories, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of date-based data to properly and efficiently perform their job functions. In certain embodiments, cloned data repositories may be created. With this in mind, the following embodiments are directed to improving the manner in which certain objects for certain data repositories, including cloned data repositories, may be developed via incident systems and/or continuous integration systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable customized systems and methods that may include an integration hub enabling the creation of integration "spokes." For example, an incident integration spoke may be used to interface with incident or issue management systems, such as Jira®. Jira® is available from Atlassian, Co., of London, United Kingdom. A continuous integration (CI) spoke may be used to interface with continuous integration (CI) systems such as Jenkins. Jenkins is available via the Jenkins project headed by the Software in the Public Interest (SPI), a non-profit 501 (c) (3) organization, of New York, U.S.A.

The incident integration spoke may interface with the incident management system to track and manage issues. Issues tracked by the incident system may include new features to add to certain software applications, bugs found in the software applications, tasks (e.g., software development tasks) to complete, and so on. The issues may then be tracked and managed via visual dashboards and workflow tracking as the software is developed and/or maintained.

In certain embodiments, the techniques described herein may automate the code merging and building of software, for example, on a continuous (e.g., scheduled) basis via the CI integration spoke. For example, source code from multiple sources may be tested (e.g., unit tested) via the CI system and combined into a main branch corresponding to a software application. Commits to a source repository, manual triggers and the like, may additionally or alternatively be used by the CI system to execute builds (e.g., compiles) of the main branch and/or other code branches.

The integration hub may additionally include or operatively couple with visual development tools, including a Flow Designer system. The Flow Designer system may be used by non-technical personnel, among others, to develop code. For example, the Flow Designer system may enable the non-technical personnel to use natural language to more easily create and visualize objects and flows that automate certain tasks. Indeed, information flow objects may be created without typing or otherwise entering text in a programming language.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Present embodiments are directed to creating one or more spokes that may provide continuous integration (CI) functionality and/or incident management or tracking functionality. As used herein, the term "spoke" may refer to a software system that is included as a subsystem of an integration hub. The phrase "integration hub" may defined herein as a software system that may provide for "codeless" development and integration with the aforementioned spokes. More specifically, the integration hub may include or operatively couple with a Flow Designer system that provides "codeless" development of software via natural language and visual information presentation. "Codeless" development may be defined herein as software development were the creator of the software does not use a computer language., e.g., Java, Javascript, C #, and the like. Instead, the creator of the software may use natural language and visual tools to create the software, for example, by designing a flowchart-like process that may take certain inputs and executes certain actions, as further described below.

The integration hub may enable the Flow Designer system to use the various spokes to create certain automated processes without having to create code via traditional computer languages. For example, the automated processes may create both an incident management spoke and a CI spoke. The incident management spoke and the CI spoke may interact with a server platform to provide for respective incident management services and CI services to the platform. Further, the Flow Designer system and/or integration hub may include or operatively couple with the incident management spoke and the CI spoke and provide for custom information flows that leverage the capabilities of their respective systems. It is to be noted that the incident management spoke described herein includes developer operations (devops) capabilities including agile project management, in addition to or alternative to bug tracking capabilities. For example, in agile project management projects may be broken down into smaller components that may be completed in work sessions that may include design through testing and quality assurance sessions. The development process may be iterative, where various "loops" or iterations of development tasks may be employed. The incident management spoke may thus enable scheduling, progress tracking, progress reporting, quality assurance testing, and so on, of software development tasks and projects.

With the preceding in mind, the following figures relate to various types of generalized system architectures or configurations that may be employed to provide services to an organization accessing a cloud-platform, such as may be embodied in a multi-instance or multi-tenant framework on which the present approaches may be employed. Correspondingly, these system and platform examples may also relate to systems and platforms on which the techniques discussed herein may be implemented or otherwise utilized.

Figure 1:
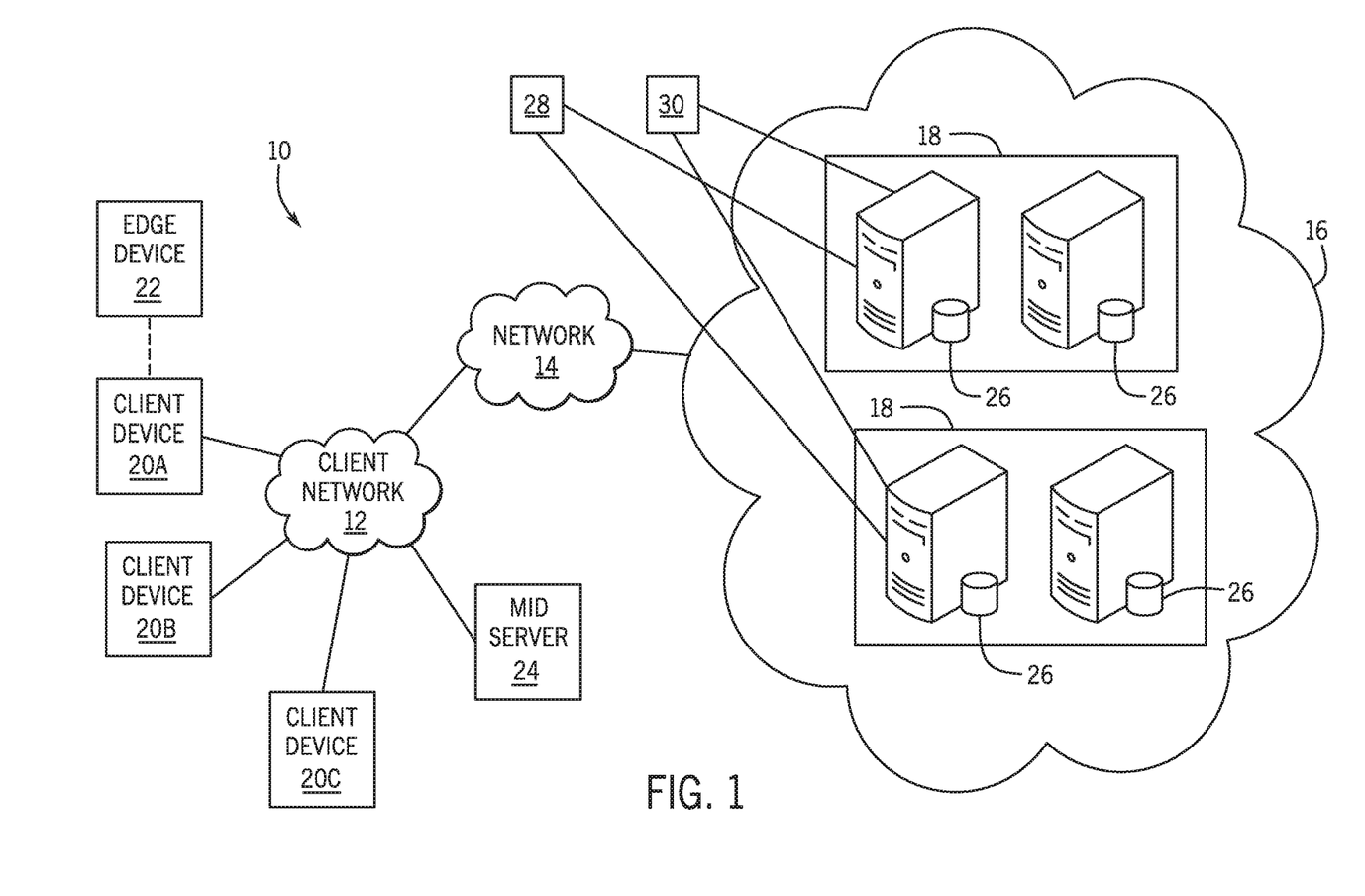
FIG. 1 is a block diagram of an embodiment of a multi-instance cloud architecture in which embodiments of the present disclosure may operate.

Turning now to FIG. 1, a schematic diagram of an embodiment of a cloud computing system 10 in which embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

It would be beneficial to integrate the virtual servers 26 with external systems, such as systems 28, 30. The system 28 may provide, for example, for incident management. The incident management system 28 may enabling planning and tracking of various software modules and/or projects during software development activities. The incident management system 28 may also track bugs, user reports, and the like, related to the software being developed. In one embodiment, the incident management system 28 may be based on or may include Jira®, available from Atlassian, Co., of London, United Kingdom.

The system 30 may provide for continuous integration (CI). For example, the CI system 30 may provide facilities to integrate software instructions or code into a shared repository via a check-in process. An automated build process may then create a new version of an application based on the code checked in. In one embodiment, the CI system 30 may be based on or include Jenkins, available via the Jenkins project headed by the Software in the Public Interest (SPI), a non-profit 501 (c) (3) organization, of New York, U.S.A. In certain embodiments, the incident management system 28 and the CI system 30 may be accessible via application programming interfaces (APIs) such as Java APIs, Representational State Transfer (REST) APIs, messaging systems, and so on.

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
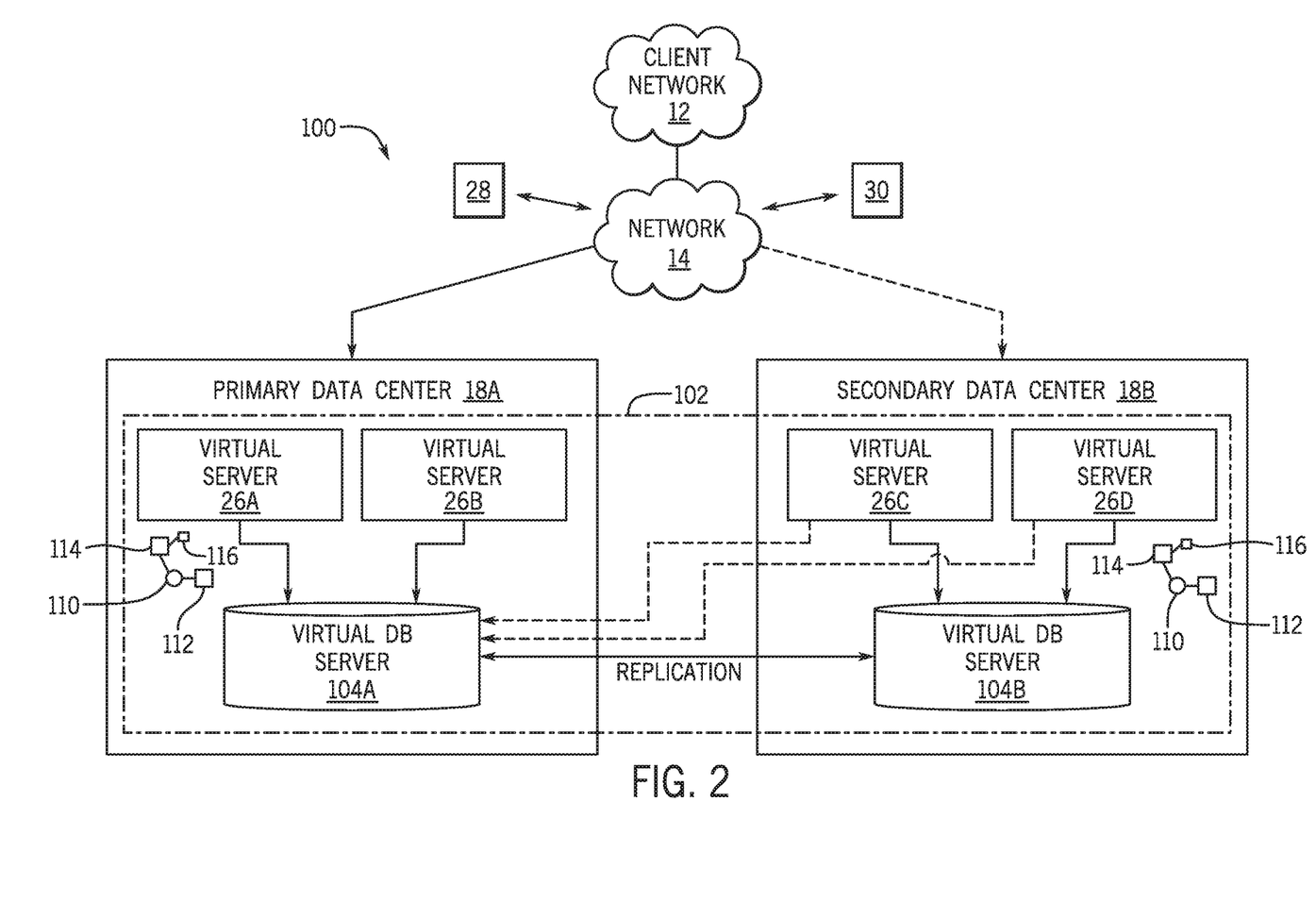
FIG. 2 is a block diagram of a computing device utilized in the distributed computing system of FIG. 1, in accordance with an embodiment.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

In the depicted embodiment, an integration hub system 110 may be operatively coupled to or include a Flow Designer system 112. The integration hub system 110 may enable the execution of third party application programming interfaces (APIs)/platforms, including objects, automated process, and so on, such as APIs included in the external systems 28 and 30. More specifically, the integration hub system 110 may enable the creation of one or more incident management spokes 114 suitable for interfacing with the incident management system 28 by using, for example, Java and/or REST APIs. Likewise, the integration hub system 110 may enable the creation of one or more CI spokes 116 suitable for interfacing with the CI system 30 by also using, for example, Java and/or REST APIs.

For example, automation processes created by the Flow Designer system 112 as further described below may create and/or use the spokes 114 and/or 116 to interface with the external systems 28 and/or 30. Further, software development activities, e.g., objects created via the Flow Designer system 112 may also be managed by the external systems 28 and/or 30 via the spokes 114 and/or 116. In one embodiment, the spokes 114 and/or 116 may be implemented as a "scoped" applications. That is, the spokes 114 and/or 116 may be implemented as computer instructions or code that include an access scope. For example, a private scope may be provided so that the spokes 114 and/or 116 may be developed on a development instance of the servers 26 to build the spokes 114 and/or 116. The spokes 114 and/or 116 may then be published in an application repository. The application repository may then be used to create a test server instance running the scoped application. Accordingly, the application may be more easily tested before being deployed. Once testing is complete, the application may be published in various ways, such as publishing to production instances of the servers 26, to online application stores, and/or via sharing facilities. Accordingly, private and public scopes may be provided.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. Using FIG. 2 as an example, the virtual servers 26A, 26B, 26C, 26D and virtual database servers 104A, 104B may be combined into a single virtual server. The use and discussion of FIGS. 1 and 2 are only examples to facilitate ease of description and explanation of discrete or functional concepts and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
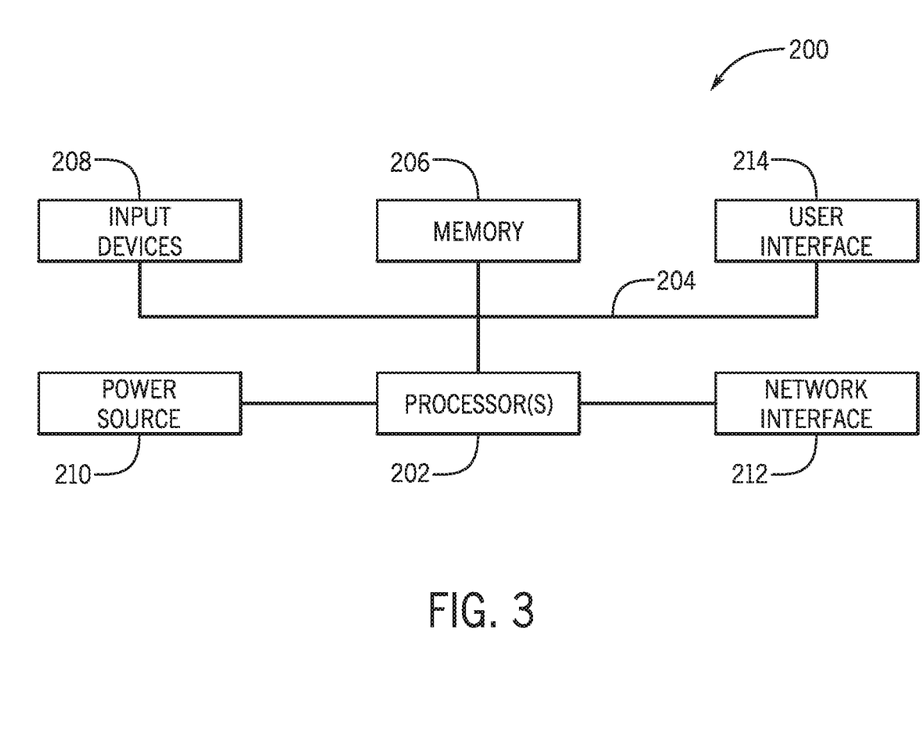
FIG. 3 is a block diagram of an embodiment of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 includes suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
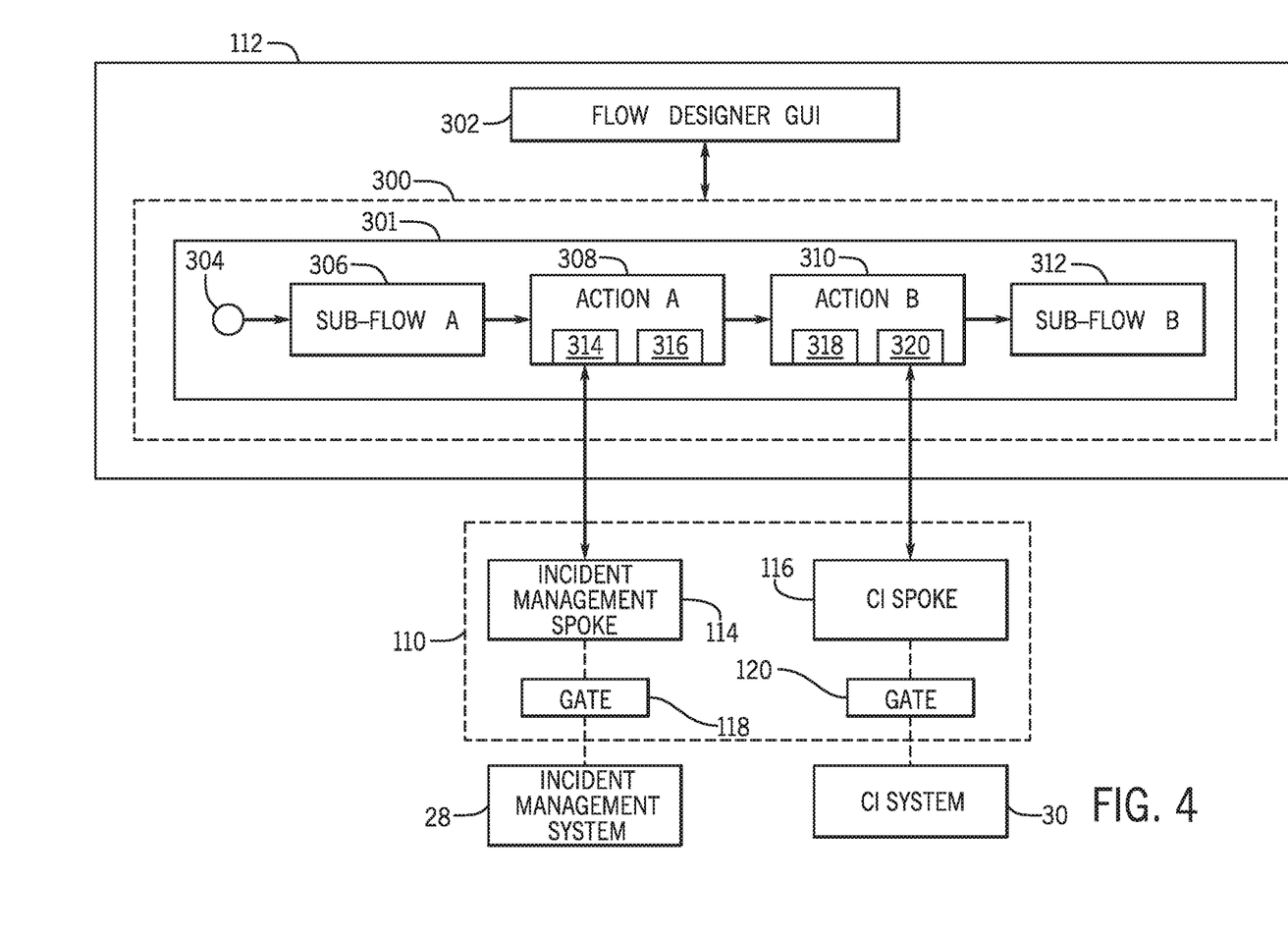
FIG. 4 is a block diagram illustrating a Flow Designer system suitable for creating certain objects, in accordance with an embodiment.

Turning now to FIG. 4, the figure is a block diagram illustrating an embodiment of the Flow Designer system 112 suitable for creating information flow objects 300 and for interfacing the flow objects 300 to the external systems 28, 30 via the integration hub system 110. More specifically the block diagram depicts the creation of the incident management spoke 114 and the CI spoke 116 which may then be used, for example via the integration hub system 110 to interface the flow objects 300 with the incident management system 28 and with the CI system 30. It is to be understood that the integration system 110, and/or the Flow Designer system 112 as depicted are examples only and may be included in or implemented using one or more of the virtual servers 26, the virtual DB servers 104, or a combination thereof. In the depicted embodiment, the Flow Designer system 112 includes a flow designer GUI 302, e.g., a visual information flow creation tool. The flow designer GUI 302 may provide for visual programming via natural languages as opposed to entering text representative of a computer program. The flow designer GUI 302 may include executable code or computer instructions suitable for creating, managing, accessing, and/or editing the flow objects 300. In the depicted embodiment, a single flow 301 is shown in the flow objects 300. It is to be understood that more than one flow may be provided in the flow objects 300.

The flow 301 may include a trigger 304 which may be "fired" or otherwise turned on by certain changed condition, such as a change in one or more records stored in a database (e.g., stored in the virtual DB servers 104). The trigger 304 may additionally be "fired" periodically, for example, as part of a schedule (e.g., hourly schedule, daily schedule, weekly schedule, monthly schedule, and so on). The trigger 304 may thus be used to initiate execution of other flow objects 300, such as sub-flow 306, Action 308, Action 310, and sub-flow 312.

In the depicted embodiment, the trigger 304 initiates execution of the sub-flow 306. The sub-flow 306 may include Actions, control logic (e.g., Boolean logic, branching logic, termination logic), other sub-flows, and so on. The sub-flow 306 may additionally take in inputs and provide outputs. For example, output of the sub-flow 306 may be used as input to the Action 308. The Action 308 may use the inputs provided to execute Steps 314, 316. The Action 308 may also include control logic. Steps, such as the Steps 314, 316, and may be self-contained code, such as scripts (e.g., Java, JavaScript code) provided by the manufacturer of the flow designer system 112. As an example, the Flow Designer system 112 may be provided by ServiceNow™ Inc., of Santa Clara, Calif., U.S.A., under the name Flow Designer™. The Steps 314, 316 may be additionally or alternatively provided by other third parties and/or coded by certain users, such as IT users.

Steps may include any number of functionality, such as requesting approval from other users of the servers 26, 104, creating records in a database table, editing the record in the database table, deleting the records in the database table, creating server tasks, logging messages, looking up database information, notifying of certain events (e.g., incidents, change requests, problems, changes to user records), executing scripts, such as JavaScript, sending email, waiting for a condition to occur, and so on. Action 310 may execute following Action 308. In turn, Action 310 may include Steps 318, 320, and upon completion of Step 320, sub-flow 312 may be executed. Once sub-flow 312 finishes execution, the flow 301 finishes. Flows, such as the flow 301, may not have outputs. The flows may be executable from external clients, such as a clients coupled to the client network 12 shown in FIG. 1.

In the depicted embodiment, the Actions 308 and 310 are shown as using the incident management spoke 114 and the CI spoke 116, respectively, for example, to interact with the incident management system 28 and with the CI system 30. It is to be noted that, in certain embodiments, any of the Flow Designer system 112 objects, such as flows, sub-flows, actions, and/or steps may interact with the incident management system 28 and with the CI system 30 via the spokes 114, 116. For example, the integration hub 110 may expose API calls that may be used to interact with the incident management system 28 and with the CI system 30. That is, the incident management system 28 and the CI system 30 may each include an API useful in calling methods, functions, creating object-oriented classes, and so on.

For example, the incident management/devops platform and/or APIs may include platforms and/or APIs to create and manage projects, to create and manage project roles (e.g., a set of permissions that users may be given, a set of email notifications that user may receive, a set of security levels that may be issued, visibility to certain comment sections, and so on), to create and manage users, to create and manage groups, and/or to create and manage issues (e.g., items of work to be completed). The issues may represent, for example, software bugs, a project task, a new software object to be developed, and so on.

CI platform/APIs may include platforms and/or APIs to submit "jobs" to be built, such as batch jobs which may include computer code to be compiled or otherwise built into executables. Jobs may be used to trigger a new "build" of the code, thus resulting in an executable application, for example. The CI APIs may include calls to determine status of builds, details of jobs, error messages, compiler messages, and so on. Further, both incident management platorms/APIs and the CI platforms/APIs may include authentication APIS suitable for providing authentication information to the systems 28, 30.

In certain embodiments, gate systems 118, 120 may be provided. The gate system 118, 120 may filter interactions with the systems 28, and 30 respectively, to prevent or ameliorate certain issues. For example, the gate systems 118, 120 may prevent too many communications (e.g., too may responses per time period) from the systems 28, 30 into the integration hub 110, or communication from undesired parties, such as from certain APIs within the systems 28, 30 that have not been called first. Accordingly, the gate systems 118, 120 may be used as communication filters by the integration hub 110.

Figure 5:
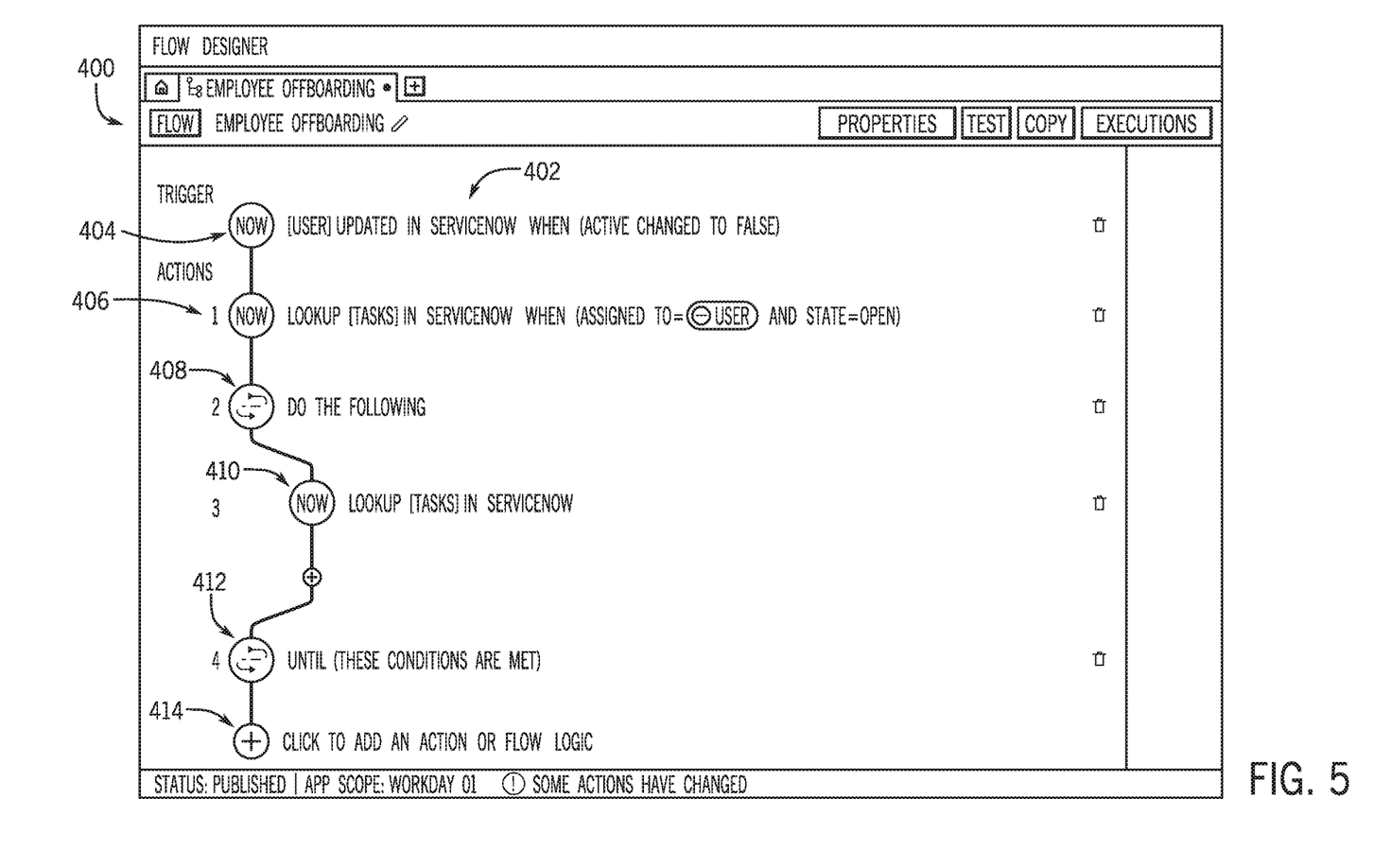
FIG. 5 is a screenshot depicting a graphical user interface (GUI) for the Flow Designer system of FIG. 4, in accordance with an embodiment.

FIG. 5 is a screenshot depicting an embodiment of a graphical user interface (GUI) 400 suitable for inputting certain flow objects 300 into a flow, such as the flow 301. The GUI 400 may be included in the integration hub 110 and used to create the flow 301 via the Flow Designer system 112. In the depicted embodiment, a graphical flow view 402 of a flow is shown. Indeed, the GUI 400 may be used to create and edit any number of graphical flow views that may then be executed as flow objects 300.

In the depicted embodiment, the graphical flow view 402 may start execution via a trigger 404. More specifically, if a certain user record is updated, then the trigger 404 may "fire" and execute Action 406. The Action 406 may then retrieve a set of tasks assigned to the updated user that have an open state. The retrieved tasks may then be further process via a "Do . . . Until" control logic. More specifically, a Do logic 408 may execute one or more Actions, such as Action 410, until the "Until" control logic 410 has its conditions met. More sub-flows and/or Actions may be added, for example, via the "+" control 414. As shown, natural language and visual composition via the flow designer 302 may be used to enable the creation of executable flow objects 300. The flow objects 300 may then be reused by clients connected to the network 12.

Figure 6:
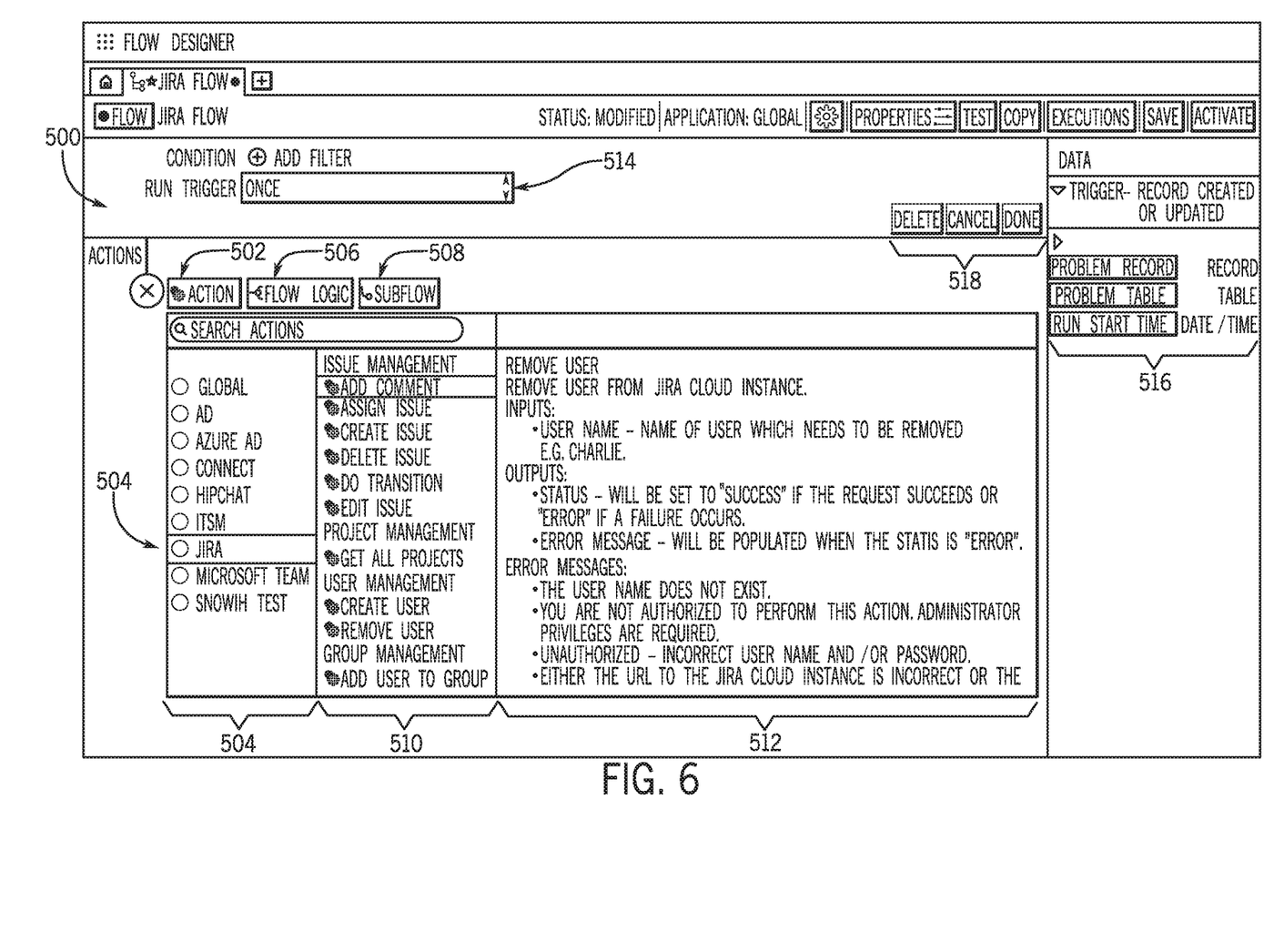
FIG. 6 is a screenshot of an embodiment of a graphical user interface (GUI) suitable for inputting certain spoke information.

It may be useful to show the creation of a spoke. Accordingly, FIG. 6 is a screenshot illustrating an embodiment of a GUI 500 suitable for inputting information that may then be used by the GUI 500 to create a spoke, such as the incident management spoke 114. The GUI 500 may be provided by the integration hub 110 and/or the Flow Designer 112. In the depicted embodiment, the GUI 500 may be used to aid a user into creating an Action, such as Actions 308, 310. For example, the GUI 500 may provide an Action tab 502 used to select an action from an Action section 504. Other tabs are also provided, such as a Flow logic tab 506 and a Subflow tab 508, suitable for creating flows and subflows.

In the depicted embodiment, an incident management (e.g., Jira®) action 510 is selected. Accordingly, an API list section 510 of the GUI 500 may display a list of one or more APIs that are provided by the incident management system 28, suitable for interaction with the incident management system 28. Further, an API description section 512 is provided, that displays a description for each API in the API list section 510, as well as inputs, outputs, error messages, and the like, useful in describing details of specific APIs. For example, details such as functions, objects, classes, methods, and so on, may be provided in the API description section 512.

A trigger section 514 is also shown, suitable for entering conditions and/or times that the action 504 may be triggered. As mentioned earlier, triggers, such as trigger 304, may be used to begin execution of certain of the flow objects, e.g., steps, actions, subflows, flows. A Data section 516 is also shown, which may provide further details of data repositories to use, tables to use, data results (e.g., records), and so on. The user may then save, delete, and/or cancel the creation of the action by activating controls in section 518.

Figure 7:
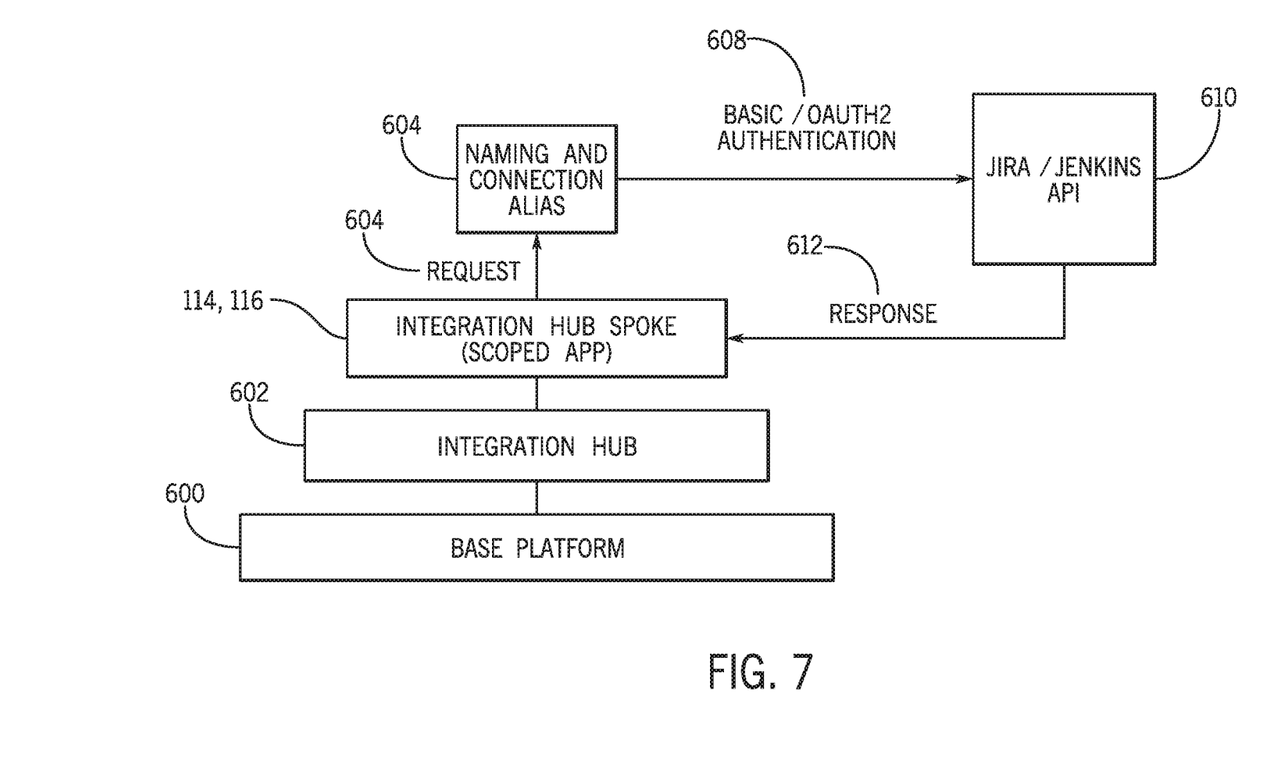
FIG. 7 is a block diagram depicting an embodiment of system layers suitable for creating and for interfacing with the incident management systems and/or continuous integration (CI) systems.

FIG. 7 is a block diagram depicting an embodiment of system layers suitable for creating and for interfacing with the incident management system 28 and/or the CI system 30. In the depicted embodiment, a base platform layer 600 may encapsulate code or computer instructions that execute functionality used in providing various services, for example, via the servers 26, 104. That is, the base platform layer 600 may include server code to executable via the servers 26, 104. An integration hub layer 602 may encapsulate the functionality provided by the integration hub 110. For example, the integration hub layer 602 may include computer code or instructions suitable for the in situ creation of one or more spokes, such as the spokes 114 and/or 116.

More specifically, the integration hub layer 602 may, in one embodiment, create the spoke 114 and/or the spoke 116 as "scoped" applications when desired by a user, such as a user creating a flow object via the Flow Designer system 112. As mentioned earlier, a private scope may be provided so that the spokes 114 and/or 116 may be developed on a development instance of the servers 26 to build the spokes 114 and/or 116. The spokes 114 and/or 116 may then be published in an application repository. The application repository may then be used to create a test server instance running the scoped application (e.g., spokes 114, 116), for example, to test the spokes 114 and/or 116 before being deployed. Once testing is complete, the spokes 114, 116 may be published in various ways, such as publishing to production instances of the servers 26, 104 to online application stores, and/or via sharing facilities.

A naming and connection alias layer 604 is also shown. During execution of the spokes 114, 116, the naming and connection alias layer 604 may receive a request 606 from the spokes 114, 116. The request 606 may be an API request. That is, the spoke 114 and/or 116 may issue an API call via the request 606 to be executed by the incident management system 28 and/or the CI system 30. Accordingly, the naming and connection alias layer 604 may use certain connection information, including uniform resource locators (URLs), encrypted logins, encrypted passwords, tokens, PGP keys, challenge response information, and the like, to communicate with the incident management system 28 and/or the CI system 30.

In certain embodiments, the naming and connection alias layer 604 may use various authentication techniques such as authorization code grant type and basic authentication techniques. Accordingly, authentication information 608, such as authorization codes, resource owner password credentials, implicit and client credentials, and the like, may be used to execute or otherwise call APIs/platforms 610. The APIs/platforms 610 may include REST APIs, Java APIs, and the like, provided by the incident management system 28 and/or the CI system 30.

The APIs/platforms 610 may be executed, e.g., via incident management systems 28, such as Jira®, and/or via CI systems 30, such as Jenkins, and then return one or more response(s) 612. The response(s) 612 may then be processed by the spokes 114, 116 to retrieve outputs, error codes, and so on. In certain embodiments, the response(s) 612 may first be processed by gates 118, 120, for example, to prevent too many responses per time interval, to prevent responses from certain parties (e.g., responses that are not initiated by calls from the spokes 114, 116), and in general, to filter the responses. The response(s) 612 may then be processed to retrieve output values, error codes, and so on.

In certain embodiments, the interaction between the spokes 114, 116 and the incident management system 28 and/or the CI system 30 may include meta-identifiers. The meta-identifiers may be used so that the APIs/platforms 610 responses are routed to respective call initiators. For example, an instance of the spoke 114 and/or 116 may include a first meta-identifier when calling the APIs/platforms 610. In turn, the APIs 610 may include the first meta-identifier in the response 612, and may include a second meta-identifier identifying an instance of the APIs/platforms 610 that processed the call. The first and/or second meta-identifiers may then be used in certain transactions that may use more than one call and/or more than one response. For example, sessions may be provided via the meta-identifiers, where various calls and responses may go back and forth between the spokes 114, 116 and the APIs 610 during a session. In this manner, various types of interactions with the incident management system 28 and the CI system 30 may be provided, including establishing communication sessions.

Figure 8:
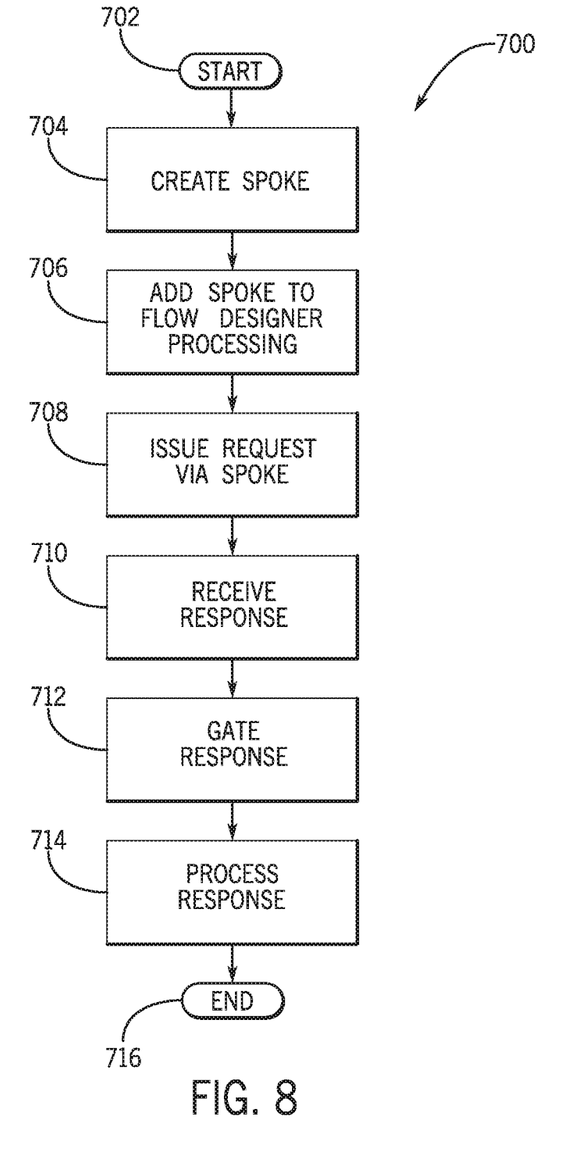
FIG. 8 is a flowchart illustrating an embodiment of a process suitable for implementing interactions between Flow Designer system objects and/or incident management systems and CI systems.

FIG. 8 is a flowchart illustrating an embodiment of a process 700 suitable for implementing interactions between Flow Designer system 112 objects and the incident management system 28 and/or the CI system 30. The process 700 may be implemented as computer instructions or code executable via the processor(s) 202 and stored in the memory 206. The process 700, for example, may be executed via the Flow Designer system 112, the integration hub 110, and/or the APIs 610.

After a start block 702, the process may create (block 704) a spoke, such as the spokes 114, 116. That is, the integration hub 110 and/or the Flow Designer system 112 may be used to create the scopes, for example, via GUI systems such as the GUI 500. The process 700 may then add (block 706) the created spoke (e.g., spoke 114, 116) to flow processing. For example, the spoke 114, 116 may be added as an action, step, sub-flow, flow, or a combination thereof, in processes that are created via the Flow Designer system 112. Indeed, custom processes may be created without using traditional programming. Instead, natural language and/or visual presentation techniques may be used via the Flow Designer system 112 and/or the integration hub 110 to create the spokes 114 and 116.

In use, the process 700 may then issue a request, such as the request 606 via the spokes 114, 116. As mentioned earlier, the request (e.g., request 606) may include authentication (e.g., Basic/Oauth2) information suitable for calling the APIs 610. That is, the APIs 601 may be executed at the incident management system 28 and/or the CI system 30 based on requests communicated by the spokes 114, 116. The incident management system 28 and/or the CI system 30 may process the request (e.g., request 606) and return a response (e.g., response 612), which may be received (block 710) by the integration hub 110. As mentioned earlier, gates 118, 120 may be used to gate (block 712) or otherwise filter the response (e.g., response 612). For example, unauthorized responses may be blocked, large numbers of responses per certain time periods (e.g., per millisecond, per second, per minute, per hour) may be filtered, responses not associated with a request may be blocked, and so on. The process 700 may then process (block 714) the response (e.g., response 612). For example, code that initiated the call to the API/platform 610 may retrieve outputs, handle error codes, send more requests, and so on. The process 700 may then end (block 716).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
a server comprising a processor communicatively coupled to a data repository and configured to store data in the data repository, wherein the processor is configured to perform operations comprising:
creating, via user input into a visual information flow creation tool, a flowchart having one or more programming logic elements and having at least one information flow object, wherein the flowchart comprises a visual computer program implementable by the processor;
creating an incident management interface for the at least one information flow object;
implementing the incident management interface to communicate with an incident management system that is external to the computing system, wherein the incident management system is configured to perform the functionality of enabling tracking of software modules during development activities;
creating a continuous integration (CI) interface for the at least one information flow object, wherein the incident management interface and the CI interface are separate interfaces; and
implementing the CI interface to communicate with a CI system that is external to the computing system, wherein the CI system is configured to perform the functionality of integrating code into the data repository and wherein the creating and implementing of the incident management interface and the CI interface, further comprises the steps of:
encapsulating code, by a base platform layer of an integration hub, that performs the respective functionality of the incident management interface and the CI interface;
creating a respective spoke, by an integration hub layer of the integration hub, based on the encapsulated code, wherein each spoke is scoped for enabling the visual computer program to perform the respective functionality with the incident management system and the CI system;
publishing the spokes to the data repository;
after the publishing of the spokes, testing, by a naming layer of the integration hub, the spokes for authentication and deployment; and
based on the testing of the spokes, deploying and implementing the spokes to the one or more programming logic elements, to perform the respective functionality of the incident management interface and the CI interface on the incident management system and the CI system.

2. The computing system of claim 1, wherein the server is configured to perform operations comprising implementing the CI interface to initiate a build of an application.

3. The computing system of claim 2, wherein the server is configured to perform operations comprising implementing the CI interface to retrieve a status of the build of the application.

4. The computing system of claim 3, wherein the application comprises a Flow Designer application.

5. The computing system of claim 1, wherein the server is configured to perform operations comprising implementing the incident management interface to create a new issue, to track an existing issue, or a combination thereof.

6. The computing system of claim 5, wherein the new issue, the existing issue, or the combination thereof, comprises a software bug, a software development task, a feature to add to the at least one information flow object, or a combination thereof.

7. The computing system of claim 1, wherein implementing the incident management interface to communicate with the incident management system comprises authenticating a request issued via the incident management interface.

8. The computing system of claim 1, wherein the at least one flow object comprises an action, a step a flow, a sub-flow, or a combination thereof, and wherein the implementing the incident management interface to communicate with the incident management system comprises implementing the action, the step, the flow, the sub-flow, or the combination thereof, to communicate with the incident management system.

9. A method, comprising:
creating, via user input into a visual information flow creation tool implementable via a processor included in a server communicatively coupled to a data repository of a computing system, a flowchart having one or more programming logic elements and having at least one information flow object, wherein the flowchart comprises a visual computer program implementable by the processor;

creating an incident management interface for the at least one information flow object;
implementing the incident management interface to communicate with an incident management system that is external to the computing system, wherein the incident management system is configured to perform the functionality of enabling tracking of software modules during development activities;
creating a continuous integration (CI) interface for the at least one information flow object, wherein the incident management interface and the CI interface are separate interfaces; and
implementing the CI interface to communicate with a CI system that is external to the computing system, wherein the CI system is configured to perform the functionality integrating code into the data repository and wherein the creating and implementing of the incident management interface and the CI interface, further comprises the steps of;
  encapsulating code, by a base platform layer of an integration hub, that performs the respective functionality of the incident management interface and the CI interface;
  creating a respective spoke, by an integration hub layer of the integration hub, based on the encapsulated code, wherein each spoke is scoped for enabling the visual computer program to perform the respective functionality with the incident management system and the CI system;
  publishing the spokes to the data repository;
  after the publishing of the spokes, testing, by a naming layer of the integration hub, the spokes for authentication and deployment; and
  based on the testing of the spokes, deploying and implementing the spokes to the one or more programming logic elements, to perform the respective functionality of the incident management interface and the CI interface on the incident management system and the CI system.

10. The method of claim 9, wherein the at least one flow object comprises an action, a step a flow, a sub-flow, or a combination thereof, and wherein implementing the incident management interface to communicate with the incident management system comprises implementing the action, the step, the flow, the sub-flow, or the combination thereof, to communicate with the incident management system.

11. A non-transitory, computer-readable medium storing instructions executable by a processor of a computing system, the instructions configured to:
  create, via user input into a visual information flow creation tool, implementable via a server processor included in a server communicatively coupled to a data repository, a flowchart having one or more programming logic elements and having at least one information flow object, wherein the flowchart comprises a visual computer program implementable by the server processor;
  create an incident management interface for the at least one information flow object;
  implement the incident management interface to communicate with an incident management system that is external to the computing system, wherein the incident management system is configured to perform the functionality of enabling tracking of software modules during development activities;
  create a continuous integration (CI) interface for the at least one information flow object, wherein the incident management interface and the CI interface are separate interfaces; and
  implement the CI interface to communicate with a CI system that is external to the computing system, wherein the CI system is configured to perform the functionality of integrating code into the data repository and wherein the instructions to create and implement the incident management interface and the CI interface further comprises instructions configured to:
    encapsulate code, by a base platform layer of an integration hub, that performs the respective functionality of the incident management interface and the CI interface;
    create a respective spoke, by an integration hub layer of the integration hub, based on the encapsulated code, wherein each spoke is scoped for enabling the visual computer program to perform the respective functionality with the incident management system and the CI system;
    publish the spokes to the data repository;
    after the publishing of the spokes, test, by a naming layer of the integration hub, the spokes for authentication and deployment; and
    based on the testing of the spokes, deploy and implement the spokes to the one or more programming logic elements, to perform the respective functionality of the incident management interface and the CI interface on the incident management system and the CI system.

12. The computer-readable medium of claim 11, wherein the at least one flow object comprises an action, a step a flow, a sub-flow, or a combination thereof, and wherein the instructions configured to implement the incident management interface to communicate with the incident management system comprise instructions configured to implement the action, the step, the flow, the sub-flow, or the combination thereof, to communicate with the incident management system.

13. The computer-readable medium of claim 12, wherein the data repository comprises a cloned data repository.

* * * * *